(12) United States Patent
Yano et al.

(10) Patent No.: US 9,309,423 B2
(45) Date of Patent: Apr. 12, 2016

(54) INK COMPOSITION AND IMAGE FORMING METHOD

(71) Applicant: Seiko Epson Corporation, Tokyo (JP)

(72) Inventors: Takeshi Yano, Shiojiri (JP); Tetsuya Aoyama, Shiojiri (JP); Hitoshi Ohta, Shiojiri (JP)

(73) Assignee: Seiko Epson Corporation (JP)

( * ) Notice: Subject to any disclaimer, the term of this patent is extended or adjusted under 35 U.S.C. 154(b) by 243 days.

(21) Appl. No.: 14/040,889

(22) Filed: Sep. 30, 2013

(65) Prior Publication Data

US 2014/0104341 A1 Apr. 17, 2014

(30) Foreign Application Priority Data

Oct. 11, 2012 (JP) .................................. 2012-225743

(51) Int. Cl.
| | |
|---|---|
| *B41J 2/01* | (2006.01) |
| *C09D 11/30* | (2014.01) |
| *B41J 2/21* | (2006.01) |
| *B41J 2/155* | (2006.01) |
| *C09D 11/322* | (2014.01) |
| *C09D 11/38* | (2014.01) |

(52) U.S. Cl.
CPC .................. *C09D 11/30* (2013.01); *B41J 2/155* (2013.01); *B41J 2/2107* (2013.01); *C09D 11/322* (2013.01); *C09D 11/38* (2013.01)

(58) Field of Classification Search
CPC ............ B41J 2/15; B41J 2/155; B41J 2/2107; B41J 2/01; B41J 2/0057; B41J 2/05; B41J 2/1433; B41J 2/1755; B41J 2/17503; B41J 2/17593; B41J 2/21; B41J 2/211; B41J 2/2114; B41J 2/2117; B41J 2/2056; B41J 11/0015; B41J 11/002; B41J 3/60; C09D 11/30; C09D 11/38; C09D 11/40; C09D 11/005; C09D 11/32; C09D 11/322; C09D 11/324; C09D 11/328; C09D 11/36; C09D 11/52; C09D 11/54; C09D 11/101; B41M 5/0011; B41M 5/0017; B41M 5/0256; B41M 5/52; B41M 5/5218; B41M 7/00; B41M 7/0072; B41M 7/0081; B41M 7/009
USPC ....................... 347/9–22, 56, 86, 88, 95–105; 106/31.13, 31.59, 31.6, 31.85, 31.89, 106/31.27, 31.77, 31.75; 523/160, 161
See application file for complete search history.

(56) References Cited

U.S. PATENT DOCUMENTS

| | | | |
|---|---|---|---|
| 7,135,208 B2 | 11/2006 | Kubota | |
| 7,537,652 B2 * | 5/2009 | Koganehira et al. | ........ 106/31.58 |
| 2002/0002930 A1 * | 1/2002 | Yamashita | ........... C09D 11/322 106/31.6 |
| 2007/0015849 A1 * | 1/2007 | Aoyama | .............. C09D 11/326 523/160 |
| 2011/0234682 A1 * | 9/2011 | Ohta et al. | ...................... 347/20 |
| 2013/0115431 A1 | 5/2013 | Aoyama et al. | |

FOREIGN PATENT DOCUMENTS

| | | |
|---|---|---|
| JP | 2004-210996 A | 7/2004 |
| JP | 2005-023253 A | 1/2005 |
| JP | 2005-194500 A | 7/2005 |
| JP | 2007-277342 A | 10/2007 |

* cited by examiner

*Primary Examiner* — Matthew Luu
*Assistant Examiner* — Rut Patel
(74) *Attorney, Agent, or Firm* — Harness, Dickey & Pierce, P.L.C.

(57) ABSTRACT

A ink composition for ink jet recording in which a non-absorbent or low absorbent recording medium is used includes water; a color material; a surfactant; a compound I represented by general formula (I) below; and does not substantially include alkyl polyols with a standard boiling point of 280° C. or higher; in which the surfactant is at least one type selected from a group consisting of a fluorine-based surfactant and a siloxane-based surfactant with 5 or more siloxane units

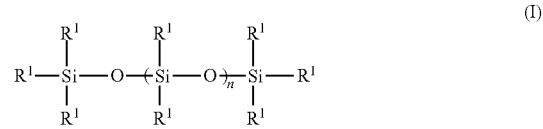

(I)

[In general formula (I), n represents an integer of 45 or higher to 230 or lower, each $R^1$ independently represents an unmodified, an ether-modified, a polyester-modified, an epoxy-modified, an amine-modified, a carboxyl-modified, a fluorine-modified, an alkyloxy-modified, a mercapto-modified, a (meth)acryl-modified, a phenol-modified, a phenyl-modified, a carbinol-modified or an aralkyl-modified hydrocarbon group.].

20 Claims, No Drawings

INK COMPOSITION AND IMAGE FORMING METHOD

Priority is claimed under 35 U.S.C. §119 to Japanese Application No. 2012-225743 filed on Oct. 11, 2012, which is hereby incorporated by reference in its entirety.

BACKGROUND

1. Technical Field

The present invention relates to an ink composition and an image forming method.

2. Related Art

The ink jet recording method is a method in which ink droplets are caused to fly, and recording is performed by the droplets being attached to a recording medium. In recent years, an ink for ink jet recording has been developed able to realize the image quality of silver halide photography, even in a case in which normal paper is used as the recording medium. Further, in addition to various types of paper, there are coated papers coated with an ink absorbing layer or the like, plastic films, fabrics and the like as the recording medium (below, also referred to as "medium"), and inks suited to performing ink jet recording with respect to each of these media have also been developed.

Examples of an ordinary ink used in ink jet recording include aqueous inks in which the main component is water, and in which a coloring agent and various additives are contained. For example, a water-based ink composition with no bleeding and excellent glossiness with respect to a specialized paper due to using a polysiloxane compound as a surfactant and adding an alkane diol, such as 1,2-hexanediol, is disclosed in JP-A-2005-194500.

Meanwhile, in a case where the ink absorption capacity of the medium is poor, permeability of the ink into the recording medium is insufficient when a water-based pigment ink is used, and there are cases of unevenness in glossiness occurring in the image. In such cases, that unevenness in glossiness is able to be improved by using an ink composition using a polyether-modified polysiloxane-based compound as a surfactant with respect to a glossy medium is disclosed in, for example, JP-A-2004-210996.

Incidentally, in a case in which a solid image (image in which ink is coated all over) is formed on a recording medium using an ink jet recording method, there is a need for wetting and spreading properties of the ink on the recording medium. Further, in cases where the recording surface of the medium does not absorb ink, or absorbs almost no ink, or in cases where the ink has characteristics of easily cissing, it is important to sufficiently increase the wetting and spreading properties of the ink and suppress cissing.

On the other hand, in a case where a solid image is formed on a recording medium by an ink jet recording method, since the number of ink droplets to be attached is able to be decreased if the volume of each of the ink droplets ejected is increased, it is possible to reduce the number of scannings, and it is expected that the head resolution (density of nozzles arranged in the head) may not be that high. In addition, in this case, with regard to the wetting and spreading properties of the ink droplets on the recording medium, it is expected that the more the composition wets and spreads, the easier it is to form a solid image.

However, in a surfactant used in inks of the related art, in particular among the media, in media which absorb little ink (low absorbent), such as plastic films and the like, or do not absorb ink (non-absorbent), the action of increasing the wetting and spreading properties of ink on the medium are not necessarily sufficient. In addition, with a surfactant of the related art, when the volume of ink droplets ejected from the head is increased, cissing and the like of the ink on the medium often occurs.

In this way, in forming a solid image with respect to a low absorbent or non-absorbent medium, there is demand for an ink with broad performance in adhesiveness, drying properties, anti-cissing properties, wetting and spreading properties, and the like. As one means for conferring such characteristics to the ink, examples include changing the type or blending of surface active substances included in the ink, and there is a need for the properties of the various types in the ink to be balanced to a high degree, in this way.

SUMMARY

An advantage of some aspects of the invention is to provide an ink composition enabling forming a satisfactory solid image with respect to a non-absorbent or low absorbent medium by blending a compound having a specified chemical structure and a surfactant, and further, to provide an image forming method forming a satisfactory solid image with respect to a non-absorbent or low absorbent medium using such an ink composition.

The invention may be realized as the following aspects or application examples.

Application Example 1

According to one aspect of the invention provided is an ink composition for ink jet recording which is used for a non-absorbent or low absorbent recording medium including water; a color material; a surfactant; a compound I represented by general formula (I) below; and not substantially including alkyl polyols with a standard boiling point of 280° C. or higher; in which the surfactant is at least one type selected from a group consisting of a fluorine-based surfactant and a siloxane-based surfactant with 5 or more siloxane units.

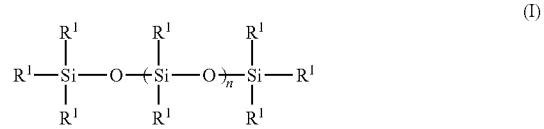

[In general formula (I), n represents an integer of 45 or higher to 230 or lower, each $R^1$ independently represents an unmodified, an ether-modified, a polyester-modified, an epoxy-modified, an amine-modified, a carboxyl-modified, a fluorine-modified, an alkyloxy-modified, a mercapto-modified, a (meth)acryl-modified, a phenol-modified, a phenyl-modified, a carbinol-modified or an aralkyl-modified hydrocarbon group.]

According to the ink composition of the application example, balance in the substances exhibiting surface activity is achieved by including at least the above-described compound I and a surfactant, and it is possible to easily form a satisfactory solid image with respect to a non-absorbent or a low absorbent medium.

Application Example 2

It is preferable that surfactant in the ink composition according to Application Example 1 have a surface tension of 15 mN/m or greater to 25 mN/m or less in a 1 mass % aqueous solution thereof.

According to the ink composition of the application example, it is possible to easily form a more satisfactory image with respect to a non-absorbent or low absorbent medium.

Application Example 3

It is preferable that the ink composition according to Application Example 1 or Application Example 2 have a value of $\alpha/\beta$ of 0.5 or greater and 20 or less in a case where the mass fraction of the surfactant is set to $\alpha$, and the mass fraction of the compound I in the ink composition is set to $\beta$.

According to the ink composition of the application example, it is further possible to easily form a satisfactory solid image with respect to a non-absorbent or a low absorbent medium with a more satisfactory balance in the blend of substances exhibiting surface activity.

Application Example 4

It is preferable that the surfactant in any one of Application Examples 1 to 3 include a compound of general formula (II) below.

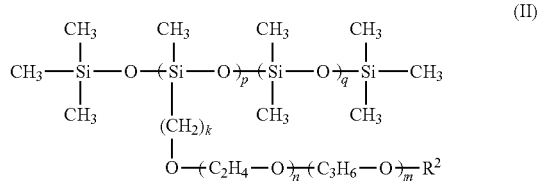

[In general formula (II), k represents an integer of 1 or higher to 5 or lower, n represents an integer of 1 or higher, m represents an integer of 0 or higher to 15 or lower, p represents an integer of 1 or higher, q represents an integer of 5 or higher or 30 or lower, the value of p/(q+p) is 0.2 or higher to 0.8 or lower, and $R^2$ represents an alkyl group having 1 to 5 hydrogen atoms or carbon atoms.]

According to the ink composition of the application example, it is possible to easily form a more satisfactory solid image with respect to a non-absorbent or low absorbent medium with more satisfactory wetting and spreading properties of the ink on the medium, and further suppress cissing on the medium.

Application Example 5

It is preferable in the Application Example 4, in general formula (II), m be 0, n represent an integer of 2 or higher to 30 or lower, p represent an integer of 5 or higher to 15 or lower, and $R^2$ be a hydrogen atom or a methyl group.

According to the ink composition of the application example, it is possible to easily form a satisfactory solid image with respect to a non-absorbent or low absorbent medium with more satisfactory wetting and spreading properties of the ink on the medium, and further suppress cissing on the medium.

Application Example 6

It is preferable that ink composition according to any one of Application Examples 1 to 5 further include a glycol ether with an HLB value of 4.2 or higher to 7.8 or lower calculated with the Davies' method.

According to the ink composition of the application example, it is possible to easily form a more satisfactory solid image with respect to a non-absorbent or low absorbent medium with extremely satisfactory wetting and spreading properties of the ink on the medium and an increased effect suppressing unevenness in tint.

Application Example 7

According to another aspect of the invention, provided is an image forming method recording an image on a non-absorbent or low absorbent recording medium by ejecting the ink composition according to any one of Application Examples 1 to 6 from a recording head.

According to the image forming method of the application example, it is possible to easily form a satisfactory solid image with respect to a non-absorbent or low absorbent recording medium.

Application Example 8

It is preferable that Application Example 7 satisfy conditions (1) or (2) below. (1) The recording head is a serial head, and the image resolution in a direction orthogonal to a main scanning direction is 4 times the head resolution or less in a direction orthogonal to the main scanning direction. (2) The recording head is a line head.

According to the image forming method of the application example, it is possible to easily form a satisfactory solid image with respect to a non-absorbent or low absorbent recording medium with a high throughput.

Application Example 9

It is preferable according to Application Example 8 that the ink composition be ejected in droplet form from the recording head, and the mass per droplet of the ink composition ejected from the recording head be 5 ng or higher to 40 ng or lower.

According to the image forming method of the application example, it is possible to more rapidly form a satisfactory solid image on a non-absorbent or low absorbent recording medium.

DESCRIPTION OF EXEMPLARY EMBODIMENTS

Below, various embodiments of the invention will be described. The embodiments described below describe one example of the invention. In addition, the invention is not limited in any way by the following embodiments, and includes various modifications carried out in a range not departing from the gist of the invention. Moreover, not all of the configurations explained below are indispensable configurations in the invention.

1. Ink Composition

The ink composition according to the present embodiment includes water, a color material, a surfactant, and a compound I represented by general formula (I) below. Further, the ink composition according to the present embodiment does not substantially include alkyl polyols with a standard boiling point of 280° C. or higher, and is used with respect to a non-absorbent or low absorbent recording medium.

1.1. Surfactant

The ink composition according to the present embodiment includes a surfactant. Examples of several actions of the surfactant include conferring wetting and spreading properties of the ink composition on the recording medium, conferring ejection stability of the ink composition ejected from the ink jet head, and preventing cissing of the ink composition on the recording medium. The surfactant may be a single compound or a mixture of a plurality of compounds, and there are cases where actions exemplified above occur independently and cases where a plurality of actions occur at the same time depending on the constitution of the surfactant and the like. When a plurality of actions of the surfactant occur, it is possible to obtain a balance of the action effects according to the object by changing the type and constitution of the surfactant.

The surfactant contained in the ink composition according to the embodiment is at least one type selected from a group consisting of a fluorine-based surfactant and a siloxane-based surfactant with 5 or more siloxane units.

The surfactant is thought to exhibit synergistic action by being contained in the ink composition together with the compound I (described later), and an effect is obtained exceeding an action obtained through the fluorine-based surfactant and/or the siloxane-based surfactant and the action obtained by the compound I being simply added.

1.1.1. Fluoroine-Based Surfactant

A fluorine-based surfactant is known to exhibit satisfactory wettability with respect to a low absorbent or non-absorbent recording medium as disclosed in International Publication No. WO 2010/050618 and International Publication No. WO 2011/007888. The fluorine-based surfactant is not particularly limited, and is able to be appropriately selected according to the object, and examples thereof include perfluoroalkyl sulfonates, perfluoroalkyl carboxylates, perfluoroalkyl phosphoric acid esters, perfluoroalkyl ethylene oxide adducts, perfluoroalkyl betaines, and perfluoroalkylamine oxide compounds. Among these, compounds represented by general formulae (1) to (6) are particularly preferable from the viewpoint of reliability, and those represented by formulae (1), (2), (3) and (6) are more preferable.

$$CF_3CF_2(CF_2CF_2)_m-CH_2CH_2O-(CH_2CH_2O)_nH \quad (1)$$

Herein, in Formula (1), m represents an integer of 0 to 10, and n represents an integer of 0 to 40.

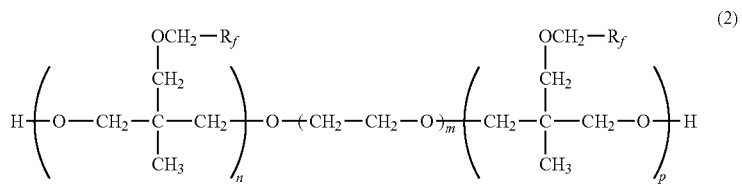

Herein, in formula (2), $R_f$ represents a group containing fluorine, for example, $-CF_3$, $-CF_2CF_3$, or the like. m, n and p respectively represent an integer; m represents an integer of 6 to 25; n represents an integer of 1 to 4; and p represents 1 to 4.

Herein, in formula (3), $M^+$ represents any of $Li^+$, $Na^+$, $K^+$ or $NH_4^+$.

$$[(R_fSO_2)_2]N^-M^+ \quad (4)$$

Herein, in formula (4), $R_f$ represents any of $-CF_3$, $-C_2F_5$, $-C_3F_7$, and $-C_4F_9$; and $M^+$ represents any of $Li^+$, $Na^+$, $K^+$, and $NH_4^+$.

$$[(R_fSO_2SO_2)(RSO_2)]N^-M^+ \quad (5)$$

Herein, in formula (5), $R_f$ represents any of $-CF_3$, $-C_2F_5$, $-C_3F_7$, and $-C_4F_9$; R represents an alkyl group with 1 to 10 carbon atoms; and $M^+$ represents any of $Li^+$, $Na^+$, $K^+$, and $NH_4^+$.

$$[(FSO_2)_2]N^-M^+ \quad (6)$$

Herein, in formula (6), $M^+$ represents any of $Li^+$, $Na^+$, $K^+$ or $NH_4^+$.

Appropriately synthesized fluorine-based surfactants other than the examples provided above may be used, or commercially available products may be used. Examples of commercially available products include S-144, S-145 (manufactured by Asahi Glass), FC-170C, FC-430, Fluorad FC4430 (manufactured by Sumitomo 3M Limited), FSO, FSO-100, FSN, FSN-100, FS-300 (manufactured by Dupont), and FT-250, 251 (manufactured by Neos Company Limited). Among these, FSO, FSO-100, FSN, FSN-100, and FS-300 are preferable in being able to provide satisfactory printing quality and stability. These fluorine-based surfactants may be used independently or 2 or more types may be used in combination.

1.1.2. Siloxane-Based Surfactant

In the present application, the siloxane-based surfactant having 5 or more siloxane units preferably includes a compound represented by formula (II) below. Moreover, any of BYK-345, BYK-348, BYK-347 (manufactured by BYK Chemie Japan Co., Ltd.), and KF-640 (manufactured by Shin-Etsu Chemical Co.) widely used in the related art are siloxane-based surfactants with 4 or fewer siloxane units, and do not fall under the compounds of formulae (II) and (I) below.

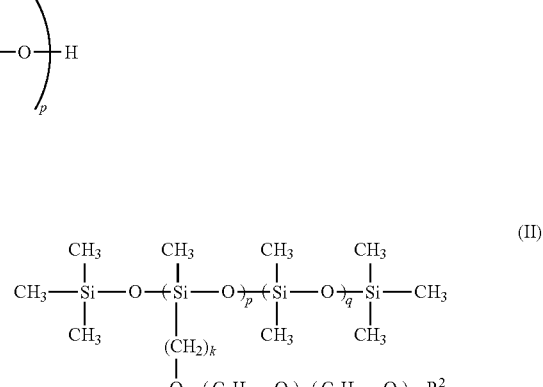

In formula (II), k represents an integer or 1 or higher to 5 or lower, preferably represents an integer of 1 or higher to 3 or lower, and particularly preferably represents an integer of 3.

n represents an integer of 1 or higher, preferably represents an integer of 2 or higher to 30 or lower, and particularly preferably represents an integer of 4 or higher to 20 or lower.

m represents an integer or 0 or higher to 15 or lower, preferably represents an integer of 0 or higher to 10 or lower, and particularly preferably represents an integer of 0.

Moreover, the notation of —C$_3$H$_6$—O— within the parentheses to which m is applied represents at least one type of —CH$_2$—CH$_2$—CH$_2$—O—, —CH$_2$—CH(CH$_3$)—O— and —CH(CH$_3$)—CH$_2$—O—.

In addition, in a case where m is not 0, the unit within the parentheses to which m is attached is not only an aspect arranged on the R$^2$ side of the terminal as shown in the drawing, and may be either of an aspect arranged between units within the parentheses to which n is attached, or an aspect in which a unit within the parentheses to which n is attached is arranged on the R$^2$ side of the terminal.

p represents an integer of 1 or higher, and preferably an integer of 5 or higher to 15 or lower.

q represents an integer of 5 or higher to 30 or lower, and preferably an integer of 5 or higher to 20 or lower.

Here, since the value of p+q is 5 or higher, the number of siloxane units of the compound of formula (II) is 5 or higher.

The value of p/(q+p) is 0.2 or higher to 0.8 or lower, and is preferably 0.3 or higher to 0.6 or lower.

R$^2$ is a hydrogen atom or an alkyl group with 1 to 5 carbon atoms, and preferably represents a hydrogen atom or a methyl group.

In the present specification, there are cases where the compound of formula (II) is referred to as a polyether siloxane-based surfactant.

Regarding the polyether siloxane-based surfactant, in a case of being a 1 mass % aqueous solution, it is preferable that each structural parameter be selected such that the surface tension at 1 Hz of the aqueous solution is 15 mN/m or higher to 25 mN/m or lower. The surface tension may be measured using, for example, a bubble pressure dynamic surface tension meter BP2 (manufactured by KRUS).

The total addition amount of one or both of the fluorine-based surfactant and the siloxane-based surfactant may be appropriately determined; however, 0.03 mass % to 3 mass % is preferable, approximately 0.1 mass % or higher to 2 mass % or lower is more preferable, and approximately 0.2 mass % or higher to 1.5 mass % or lower is still more preferable. If 0.2 mass % or higher to 1.5 mass % or lower, because the wetting and spreading properties of the ink composition on the medium become particularly good, it becomes easier to form a solid image in a case of being applied to ink jet recording.

In addition, when the content (mass fraction) of the surfactant in the ink composition is set to α, and the content (mass fraction) of the compound I described later is set to β, the value of α/β is more preferably 0.5 or higher to 20 or lower. If the value of α/β is in this range, the balance of the blending of substances exhibiting surface activity in the ink composition becomes still better, and it is possible to easily form a more satisfactory solid image with respect to a non-absorbent or low absorbent medium. From the same viewpoint, it is preferable if the value of α/β is greater than 1 and 20 or less (that is, α is more plentiful than β).

1.2. Compound I

The ink composition of the present embodiment includes a compound I represented by general formula (I) below.

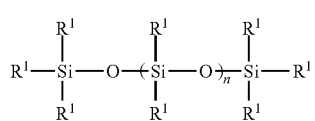

(I)

In general formula (I), n represents an integer of 45 or higher to 230 or lower, each R$^1$ independently represents an unmodified, an ether-modified, a polyester-modified, an epoxy-modified, an amine-modified, a carboxyl-modified, a fluorine-modified, an alkyloxy-modified, a mercapto-modified, a (meth)acryl-modified, a phenol-modified, a phenyl-modified, a carbinol-modified or an aralkyl-modified hydrocarbon group.

The compound I differs from the polyether siloxane-based surfactant on the point of a larger number of siloxane units (units within parentheses to which n is attached), and further differs on the point that the hydrophobicity of compound I is high because R$^1$ is an unmodified hydrocarbon group and the number thereof is high. In addition, compound I is able to behave as a substance conferring surface activity; however, it is thought to be a substance with stronger hydrophobicity compared to the above-described polyether siloxane-based surfactant.

In the compound of general formula (I), R$^1$ is more preferably an ether-modified or a polyester-modified hydrocarbon group. In addition, the two R$^1$'s present in the siloxane unit are both methyl groups, that is, the siloxane unit is preferably dimethyl siloxane.

Specific examples of the compound I include polyether-modified organosiloxane or the like. In more detail, examples include BYK-378, BYK-333 and BYK-337 (all product names, manufactured by BYK Chemie Japan Co., Ltd.).

Examples of several actions of the compound I, similarly to the surfactant, include conferring wetting and spreading properties of the ink composition on the recording medium, conferring ejection stability of the ink composition ejected from the ink jet head, and preventing cissing of the ink composition on the recording medium. The compound I may be a single compound represented by general formula (I) or a mixture of a plurality of compounds represented by general formula (I), and further there are cases where actions exemplified above occur independently and cases where a plurality of actions occur at the same time. When a plurality of actions of the compound I occur, it is possible to obtain a balance of the action effects according to the object by changing the type and constitution of the compound I.

The compound I contained in the ink composition of the present embodiment, by being contained in the ink composition together with the surfactant, is thought to obtain a synergistic effect exceeding an action obtained through the surfactant and an action obtained by the compound I being simply added.

In addition, when the content (mass fraction) of the surfactant in the ink composition is set to α, and the content (mass fraction) of the compound I is set to β, the value of α/β is more preferably 0.5 or higher to 20 or lower. If the value of α/β is in this range, the balance of the blending of substances exhibiting surface activity in the ink composition becomes still better, and it is possible to easily form a more satisfactory solid image with respect to a non-absorbent or low absorbent medium. From the same viewpoint, it is preferable if the value of α/β is greater than 1 and 20 or less (that is, α is more plentiful than β.)

1.3. Alkyl Polyol

The ink composition of the present embodiment does not substantially include an alkyl polyol with a standard boiling point of 280° C. or higher. Here, the expression "does not substantially include X" signifies the extent that X is not intentionally added when the ink composition is prepared, and that it is not problematic even if minute amounts of X inevitably mixed in or generated during preparation or during storage of the ink composition are included. Specific examples of "does not substantially include" include, for example, not including 1.0 mass % or higher, preferably not including 0.5 mass % or higher, more preferably not including 0.1 mass % or higher, still more preferably not including 0.05 mass % or higher, and particularly preferably not including 0.01 mass % or higher.

Examples of the alkyl polyols of which the standard boiling point is 280° C. or higher include glycerin (standard boiling point 290° C.).

Moreover, the ink composition according to the present embodiment may contain alkyl polyols with a standard boiling point of 180° C. or higher to less than 280° C. The ink composition of the present embodiment is able to control the wetting and spreading properties, permeability, drying properties and the like of the ink composition on the medium with very little influence from the type of recording medium by containing an alkyl polyol with a boiling point in the above-described range. In so doing, it is possible to record an image in which the fixing properties with respect to a target recording medium which is non-absorbent or has low absorbent to ink are particularly superior, and further it is possible to reduce clogging of the nozzles in the recording head.

In a case in which an alkyl polyol is blended in the ink composition, one with a standard boiling point of 188° C. or higher to 230° C. or lower is preferably used. By the standard boiling point of the alkyl polyols being within the above-described range, the moisture retaining properties of the ink are favorable and occurrence of clogging of the nozzles is easily suppressed. In addition, by the standard boiling point of the alkyl polyols being within the above-described range, since the moisture retaining properties of the ink do not excessively increase, occurrence of unevenness in the tint of the image or lowering of the fixing properties of the image may be suppressed.

Examples of alkyl polyols with a standard boiling point of 180° C. or higher to 230° C. or lower include propylene glycol [188° C.], dipropylene glycol [230° C.], 1,2-butanediol [194° C.], 1,2-pentanediol [210° C.], 1,2-hexanediol [224° C.], 1,2-heptanediol [227° C.], 3-methyl-1,3-butanediol [203° C.], 2-ethyl-2-methyl-1,3-propanediol [226° C.], 2-methyl-1,3-propanediol [214° C.], 2-methyl-2-propyl-1,3-propanediol [230° C.], 2,2-dimethyl-1,3-propanediol [210° C.], and 2-methyl pentane-2,4-diol [197° C.]. Here, the numerical values in parentheses represent the standard boiling point.

In a case where an alkyl polyol with a standard boiling point of 180° C. or higher to 230° C. or lower is blended in the ink composition, one type may be used independently, or two or more types may be used in combination. In addition, in this case, the content of the alkyl polyol is preferably in a range of 2 mass % or more to 20 mass % or less with respect to the total mass of the ink composition from the viewpoint of the effect of reducing the unevenness in the tint by improving the wetting and spreading properties on the medium or securing the storage stability and ejection reliability of the ink composition. By the content of the alkyl polyol being within the above-described range, the storage stability of the ink and the moisture retaining property of the ink become favorable, and there are cases where it is possible to reduce the occurrence of clogging in the nozzles. In addition, by the content of the alkyl polyol being in the above-described range, since the moisture retaining properties of the ink composition do not excessively increase, and the occurrence of unevenness in the tint reduces and an image with satisfactory fixing properties is obtained.

Since the ink of the present embodiment does not substantially contain an alkyl polyol with a standard boiling point of 280° C. or higher, there is no significant reduction in the drying properties of the ink composition. As a result, on a recording medium which is non-absorbent or has low absorbent to ink, unevenness in the tint of an image does not easily occur, and the fixing properties of the image also become satisfactory.

1.4. Color Material

The ink composition according to the present embodiment contains a color material. Examples of the color material include dyes or pigments, and pigments are preferable from the viewpoint of water resistance, gas resistance, light resistance, and the like.

As such pigments, it is possible to use any known inorganic pigments, organic pigments, or carbon black. The above pigments are preferably included in a range of 0.5 mass % or higher to 20 mass % or lower with respect to the total mass of the ink, and more preferably included in a range of 1 mass % or higher to 10 mass % or lower.

In order to apply the pigment to the ink composition, it is preferable that the pigment be stably dispersed and held in water. Examples of the method include a method of being dispersed in a resin dispersant of a water-soluble resin and/or a water-dispersible resin (below, pigments treated according to this method are referred to as "resin-dispersed pigments"); a method of being dispersed in a dispersant (below, pigments treated according to this method are described as "dispersant-dispersed pigments"); and a method chemically and physically introducing a hydrophilic functional group to the pigment particle surface and enabling the pigment dispersing and/or dissolving in water without the resin or a dispersant (below, pigments treated according to this method are described as "surface treated pigments"). The ink composition according to the present embodiment may use any of the resin-dispersed pigment, the dispersant-dispersed pigment, and the surface treated pigment, and these may be used in the form of a plurality of types mixed together according to necessity; however, it is preferable that the resin-dispersed pigment be contained.

Examples of the resin dispersant used in the resin-dispersed pigment include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymers, and salts thereof. Among these, a copolymer of a monomer having a hydrophobic functional group and a monomer having a hydrophilic functional group, and a polymer formed from monomers having both a hydrophobic functional group and a hydrophilic functional group are preferable. As the form of the copolymer, it is possible to use any form of a random copolymer, a block copolymer, an alternating copolymer, and a graft copolymer.

The molecular weight of the resin dispersant is preferably in a range of 1,000 to 100,000 as the weight average molecular weight, and more preferably in a range of 3,000 to 10,000. By the molecular weight being in the above range, the pigment is stably dispersed in water, and further control of the viscosity and the like are easily performed when applied to the ink composition.

It is possible to use commercially available products as the resin dispersant. Specific examples thereof include JONCRYL 67 (weight average molecular weight: 12,500, acid value: 213), JONCRYL 678 (weight average molecular weight: 8,500, acid value: 215), JONCRYL 586 (weight average molecular weight: 4,600, acid value: 108), JONCRYL 611 (weight average molecular weight: 8,100, acid value: 53), JONCRYL 680 (weight average molecular weight: 4,900, acid value: 215), JONCRYL 682 (weight average molecular weight: 1,700, acid value: 238), JONCRYL 683 (weight average molecular weight: 8,000, acid value: 160), and JONCRYL 690 (weight average molecular weight: 16,500, acid value: 240) (all product names; manufactured by BASF Japan Ltd.).

In addition, examples of the dispersant used in the dispersant-dispersed pigment include anionic surfactants, such as alkane sulfonates, α-olefin sulfonates, alkylbenzene sulfonates, alkylnaphthalene sulfonates, acyl methyl taurinates, dialkyl sulfosuccinates, alkylsulfate ester salts, sulfurized olefin, polyoxyethylene alkyl ether sulfate ester salts, alkyl phosphate ester salts, polyoxyethylene alkyl ether phosphate ester salts, and monoglyceride phosphate ester salts; amphoteric surfactants, such as alkylpyridinium salts, and alkylamino acid salts, and alkyl dimethyl betaine; and non-ionic surfactants, such as polyoxyethylene alkyl ethers, polyoxyethylene alkyl phenyl ethers, polyoxyethylene alkyl esters, polyoxyethylene alkyl amides, glycerin alkyl esters, and sorbitan alkyl esters.

The addition amount of the resin dispersant or the surfactant with respect to the pigment is preferably 1 part by mass or higher to 100 parts by mass or lower with respect to 100 parts by mass of pigment, and more preferably 5 parts by mass or higher to 50 parts by mass or lower. By being in this range, the dispersion stability of the pigment in water is further improved.

As the method of dispersing the above-mentioned resin-dispersed pigment, dispersant-dispersed pigment, and surface treated pigment in water, the pigment, water, and the resin dispersant are added for the resin-dispersed pigment; pigment, water, and a dispersant are added for the dispersant-dispersed pigment; the surface treated pigment and water are added for the surface treated pigment; and further a water-soluble organic solvent, a neutralizing agent, and the like are added as respectively necessary, and it is possible perform dispersion using a dispersing machine used in the related art, such as a ball mill, a sand mill, an attritor, a roll mill, an agitator mill, a Henschel mixer, a colloid mill, an ultrasonic homogenizer, a jet mill, an ong mill, or the like. In such a case, as the particle diameter of the pigment, performing dispersion until the average particle diameter reaches 20 nm or higher to 500 nm or lower, and more preferably 50 nm or higher to 180 nm or lower, is preferable in terms of securing the dispersion stability of the pigment in water.

1.5. Water

The ink composition according to the present embodiment contains water. Water is the main medium of the ink composition, and is a component evaporated by drying. The water is preferably one for which ionic impurities have been removed such as pure water or ultrapure water, such as ion exchange water, ultrafiltration water, reverse osmosis water, or distilled water. In addition, when water, which has been sterilized by ultraviolet irradiation or the addition of hydrogen peroxide is used, it is possible to favorably prevent the occurrence of mildew or bacteria in a case in which a pigment dispersion solution and an ink composition using the dispersion are stored over an extended period.

1.6. Other Components 1.6.1. Glycol Ether

The ink composition according to the present embodiment may contain glycol ethers for which the HLB value calculated by the Davies' method is 4.2 or higher to 7.8 or lower. By including a glycol ether satisfying the above HLB value range, the ink composition according to the present embodiment is able to control the wetting and spreading properties on the recording medium, and the permeation rate to the recording medium with very little influence from the type of recording medium. In so doing, a more vivid image with less unevenness in the tint is able to recorded with respect to a target recording medium which is non-absorbent or has low absorbent to ink.

Here, the HLB value of the glycol ethers used in the present embodiment is a value to evaluate the hydrophilicity of compounds proposed by Davis et al. and is determined by the Davies' method defined in, for example, the document "J. T. Davies and E. K. Rideal, Interface Phenomena, 2nd Ed. Academic Press, New York 1963". The HLB value is calculated according to the formula below.

HLB value=$7+\Sigma[1]+\Sigma[2]$ (In the formula above, [1] represents the group number of the hydrophilic groups, and [2] represents the group number of hydrophobic groups.)

In the table below, the group numbers of representative hydrophilic groups and hydrophobic groups are illustrated.

TABLE 1

| Structures | Group Number |
|---|---|
| —$CH_2$— | −0.475 |
| —$CH_3$ | −0.475 |
| —($CH_2CH_2O$)— | +0.330 |
| —($CHCH_2O$)—<br>    $\|$<br>    $CH_3$ | −0.150 |
| —OH | +1.900 |

In a case where glycol ether is contained in the ink composition according to the present embodiment, it is more preferable that the HLB value calculated according to the Davies' method be 5.4 or higher to 7.0 or lower. By the HLB value being within the above range, the affinity between the glycol ether and the water becomes satisfactory, and there are cases where the storage stability of the ink composition is able to be made satisfactory. In addition, by the HLB value being within the above range, the wetting and spreading properties on the recording medium and the permeability to the recording medium is more satisfactory, and there are cases in which a more satisfactory solid image is obtained with less unevenness in tint.

Specific examples of such glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol 2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, and tripropylene glycol monomethyl ether. These may be used independently as one type, or as a mixture of two or more types.

Among the exemplified glycol ethers, the alkyl group included in the glycol ethers more preferably has a branched structure. By containing a glycol ether having an alkyl group with a branched structure, in particular, it is possible to record vivid images with less unevenness in tint with respect to a target recording medium which is non-absorbent or has low absorbent to ink. More specifically, examples thereof include ethylene glycol monoisobutyl ether, ethylene glycol monoisohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether.

Further, even in the branched structure of the alkyl group included in the glycol ether, a 2-methylpentyl group, a 2-ethylpentyl group, and a 2-ethylhexyl group are more preferable from the viewpoint of further increasing the chromagenicity in an image of the ink composition, and a 2-ethylhexyl group is particularly preferable. Specifically, examples thereof include ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-methylpentyl ether, and diethylene glycol mono-2-methylpentyl ether, and ethylene glycol mono-2-ethylhexyl ether, diethylene glycol mono-2-ethylhexyl ether, triethylene glycol mono-2-ethylhexyl ether, and the like are particularly preferable.

The content in a case of the glycol ester being 6 contained in the ink composition is preferably 0.05 mass % to mass % with respect to the total mass of the ink composition, and more preferably 0.1 mass % to 3 mass %, from the viewpoint of the effect of reducing unevenness in the tint by improving the wetting and spreading properties on the recording medium and the permeability, or securing the storage stability and ejection reliability of the ink composition. By the content of the glycol ethers being within the above-described range, the wettability, permeability and the drying properties of the ink composition become satisfactory, and there are cases where an image provided with a satisfactory printing density (chromagenicity) is obtained. In addition, by the content of the glycol ether being within the above-described range, it is possible to appropriately set the viscosity of the ink composition, and there are cases in which it is possible to reduce the occurrence of clogging of the nozzles.

1.6.2. Other Surface Active Substances

The ink composition of the present embodiment may contain various substances conferring surface activity in addition to the surfactants described in the item "1.1. Surfactant".

The surface active substances described herein may have the action of causing the ink composition to wet and spread evenly on the medium. Such surface active substances are not particularly limited; however a non-ionic surfactant is preferable. As the non-ionic surfactant, surfactants other than the above-described polyether siloxane-based surfactant and compound I, for example, compounds represented by formula (7) below are suitable.

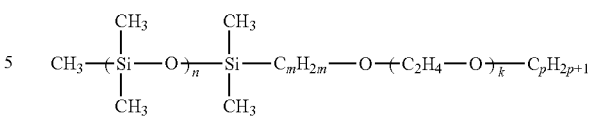

Here, in general formula (7) above, n represents an integer of 1 or higher to 5 or lower, and preferably an integer of 1 or 2; m represents an integer of 1 or higher to 5 or lower, and preferably an integer of 1 or higher to 3 or lower, and particularly preferably an integer of 3; k represents an integer of 3 or higher to 20 or lower, preferably an integer of 5 or higher to 15 or lower, and particularly preferably an integer of 6 or higher to 10 or lower; and p represents an integer of 1 or higher to 6 or lower, and preferably an integer of 2 or higher to 5 or lower.

In addition, examples of the non-ionic surfactant include an acetylene glycol-based surfactant, and the acetylene glycol-based surfactant may be suitably used in the ink composition of the present embodiment.

The acetylene glycol-based surfactant has excellent ability to appropriately maintain the surface tension and interfacial tension, compared to other non-ionic surfactants. In so doing, since the ink composition containing the acetylene glycol-based surfactant is able to appropriately maintain the surface tension and the interfacial tension with a printer member coming into contact with the ink of the head nozzle surface or the like, it is possible to increase the ejection stability in a case in which the above is applied to the ink jet recording method. In addition, there are cases in which the acetylene glycol-based surfactant has characteristics suppressing foaming, and there are cases in which the acetylene glycol-based surfactant functions as an anti-foaming agent.

Examples of the acetylene glycol-based surfactant include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (all product names, manufactured by Air Products and Chemicals. Inc.), Olfine B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3, (all product names, manufactured by Nissin Chemical Industry Co., Ltd.), and Acetylenol E00, E00P, E40, E100, (all product names, produced by Kawaken Fine Chemicals Co., Ltd.).

1.6.3. Other Substances

The ink composition according to the present embodiment may contain pH adjusters, such as potassium hydroxide or triethanolamine, chelating agents such as ethylenediamine tetraacetate (EDTA), preservatives and fungicides and anti-rust agents without particular limitation, in addition to the above-described components.

1.7. Preparation Method of Ink Composition

The ink composition according to the present embodiment is obtained by mixing the above-mentioned components in an arbitrary order, and removing impurities by performing filtration or the like as necessary. As methods of mixing each component, a method of sequentially adding materials to a container provided with a stirring device, such as a mechanical stirrer or a magnetic stirrer, and then stirring and mixing may be suitably used. As the filtration method, it is possible to perform centrifugal filtration, filtration using a filter, or the like according to necessity.

1.10. Physical Properties of Ink Composition

The ink composition according to the present embodiment preferably has a surface tension at 20° C. from 20 mN/m or higher to 50 mN/m, and more preferably from 25 mN/m or more to 40 mN/m or less, from the viewpoint of balance between recording quality and reliability as an ink composition for ink jet use. Moreover, measurement of the surface tension may be performed using a Full Automatic Surface Tensiometer CBVP-Z (manufactured by Kyowa Interface Science Co., Ltd.) by verifying the surface tension when a platinum plate is wet with ink in an environment of 20° C.

In addition, from a similar viewpoint, the viscosity at 20° C. of the ink according to the present embodiment is preferably from 2 mPa·s or higher to 15 mPa·s or lower, and more preferably from 2 mPa·s or higher to 10 mPa·s or lower. Moreover, the measurement of the viscosity may be performed by using a viscoelastic analyzer MCR-300 (manufactured by Pysica Co., Ltd) by raising the shear rate from 10 to 1000 and reading the viscosity when the shear rate is 200 in an environment of 20° C.

1.11. Recording Medium

The ink composition according to the present embodiment is used with respect to a non-absorbent or low absorbent recording medium. Here, the term "non-absorbent or low absorbent recording medium" indicates a recording medium having the characteristics of none of or absorbing almost none of an ink composition in the recording surface.

Quantitatively, the term "non-absorbent or low absorbent recording medium" indicates "a recording medium for which the water absorption amount from the start of contact until 30 msec$^{1/2}$ is 10 mL/m$^2$ or less according to the Bristow method". The Bristow method is the most widely used method as a method of measuring the liquid absorption amount in a short time, and is also employed by the Japan Technical Association of the Pulp and Paper Industry (JAPAN TAPPI). The details of the testing method are disclosed in the standard No. 51 "Paper and Cardboard—Liquid Absorbency Test Method—Bristow Method" of the "JAPAN TAPPI Paper and Pulp Test Method 2000 Edition".

Examples of a non-absorbent recording medium include plastic films not having an ink absorbing layer, base materials such as paper coated with a plastic, or to which a plastic film is attached. Examples of the plastic mentioned here include polyvinyl chloride, polyethylene terephthalate, polycarbonate, polystyrene, polyurethane, polyethylene, and polypropylene.

In addition, examples of the low absorbent recording medium include coated papers provided with a coating layer for receiving oil-based inks on the surface, for example, actual printing stock, such as art papers, coated papers, and matte papers. Further, in addition to the above-described recording media, the medium may be a recording medium which is non-absorbent or has low absorbent to ink, such as metal or glass.

In addition, the non-absorbent or low absorbent recording medium may be classified according to the wettability with respect to water on the recording surface. For example, it is possible to distinguish recording media by adding a 0.5 µl water droplet onto the recording surface of the recording medium and measuring the rate of decrease of the contact angle (comparison of the contact angle at 0.5 milliseconds after landing and the contact angle at 5 seconds after landing). More specifically, the term non-absorbent indicates that above-described rate of decrease is less than 1%, low absorbent indicates that the rate of decrease is 1% or higher to less than 5%, and absorbent indicates that the rate of decrease is 5% or higher, as characteristics of the recording medium. Moreover, the contact angle may be measured using a portable contact angle meter PCA-1 (manufactured by Kyowa Kaimen Kagaku), or the like.

1.12. Action Effects

According to the ink composition of the embodiment, balance in the substances exhibiting surface activity is achieved by including at least the above-described compound I and the surfactant, and it is possible to easily form a satisfactory solid image with respect to a non-absorbent or low absorbent medium.

2. Image Forming Method

The image forming method according to present embodiment is an image forming method using an ink jet recording device having a recording head, and is a method of forming an image on a non-absorbent or low absorbent recording medium by ejecting the above-described ink composition from a recording head. Firstly, an ink jet recording device used for the ink jet recording method according to the present embodiment will be described.

2.1. Ink Jet Recording Device

The image forming method of the present embodiment may use either of a serial-type ink jet recording device or a line-type ink jet recording device. In either type of these ink jet recording devices, a recording head is mounted, and it is possible to form a predetermined image by droplets of the ink composition being ejected at a predetermined timing and with a predetermined volume (mass) from the nozzle apertures of the recording head while the relative positional relationship between the recording medium and the recording head is changed, and the ink composition being attached to the recording surface of the recording medium.

Here, in a serial-type ink jet recording device, the transport direction of the recording medium and the direction of the reciprocating operation of the recording head ordinarily intersect, and the relative positional relationship between the recording medium and the recording head is changed by a combination of the reciprocating operation of the recording head and the transport operation of the recording medium (including reciprocating operation). In addition, in this case, ordinarily, a plurality of nozzle apertures (holes ejecting the ink composition) are arranged in the recording head, and rows of nozzle apertures (nozzle apertures) are formed along the transport direction of the recording medium. In addition, in the recording head, there are cases in which a plurality of nozzle rows are formed according to the number of types of ink composition.

In contrast, in a line-type ink jet recording device, the relative positional relationship between the recording medium and recording head is ordinarily changed by changing the relative positional relationship between the recording medium and the recording head by transporting the recording medium, without the recording head performing a reciprocating operation or the like. Even in this case, ordinarily, a plurality or nozzle apertures is arranged in the recording head, and rows of nozzle apertures (nozzle rows) are formed along the direction intersecting the transport direction of the recording medium.

Moreover, in the serial-type ink jet recording device, the direction of the reciprocating operation of the recording head may be referred to as the "main scanning direction" and further, the transport direction of the recording medium may be referred to as the "sub-scanning direction" in the present specification. On the other hand, in the line-type ink jet recording device, the transport direction of the recording medium may be referred to as the "scanning direction".

Next, the relationship between the resolution of the image formed on the recording medium and the number of nozzle apertures arranged in the recording head for each length of nozzle row (below, also referred to as "head resolution") will be described. In a case in which the head resolution is, for example, 180 nozzle apertures per inch (that is, 180 dpi (dots/inch)), 180 dpi dot rows are formed corresponding to the arrangement of the nozzles in the nozzle rows are formed on the recording medium, in a case in which the ink composition is ejected from the each nozzle aperture with respect to the recording medium. Also in a case in which droplets of the ink composition are ejected from the each nozzle aperture while the recording head and the recording medium are relatively moved in a direction orthogonal to the direction in which the nozzle rows extend, dots are formed at 180 dpi on the recording medium in a direction along the direction of the nozzle rows. That is, in this case, the resolution (image resolution) of the image in a direction (direction orthogonal to the main scanning direction) along the direction in which the nozzle rows extend is 180 dpi.

Moreover, the pitch of the droplets on the recording medium in a direction perpendicular to the direction of the nozzle rows of the recording head depends on the time interval at which the droplets are ejected from the nozzle apertures. In a case in which the recording head and the recording medium are relatively moved in a direction orthogonal to the nozzle rows, the relationship between the image resolution and the head resolution is shared by the serial-type and line-type ink jet recording device.

In addition, in the serial-type ink jet recording device, because it is possible for the recording medium to be moved in a direction intersecting with respect to the direction of the reciprocating operation of the recording head, even if the resolution of the recording head is, for example, 180 dpi, it is possible for the pitch of the dots in a direction along the nozzle rows to be made smaller in an image formed on the recording medium by the recording medium being moved. That is, after recording is performed with respect to the recording medium by moving the recording head in a direction orthogonal to the nozzle rows, the recording medium is moved in a direction along the nozzle rows of the recording head by only, for example, a distance of ½ the pitch of the dots, and if recording is performed again with respect to the recording medium by the recording head being moved in a direction orthogonal to the nozzle rows, it is possible for the resolution of the image formed on the recording medium in a direction along the nozzle rows to correspond to be 2 times, that is, correspond to 360 dpi. Furthermore, because the movement distance of the recording medium in a direction along the nozzle rows of the recording head is able to be set to ⅓, ¼, ⅛ or the like of the dot pitch, it is easy to form an image at a higher resolution than the head resolution. However, in a case of increasing the image resolution by such a method, the trade-off relationship between the image resolution and the time needed for image formation should be noted.

In the ink jet recording device used in the present embodiment, for example, it is possible to employ known configurations, such as, drying units, roll units, or winding units, without limitation.

2.2. Formation of Solid Image

Next, a case of forming a solid image on a recording medium will be described. The term "solid image" refers to an image in which the ink composition is arranged on a recording medium without any gaps. In other words, the term "solid image" indicates an image in a state in which the ink composition is present in gap portions in cases in which droplets of the ink composition are attached on the recording medium with a predetermined pitch therebetween. As described above, since the concept of head resolution is present in ink jet recording, in order to form a solid image, there is a need for the ink composition to be attached by wetting and spreading on the recording medium to an extent enabling filling in of the pitch of the nozzle apertures.

Accordingly, in order to form a solid image, it is thought that increasing the volume (mass) of the droplets of the ink composition, increasing the wetting and spreading properties of the ink composition on the recording medium, suppressing cissing of the ink composition on the recording medium, increasing the head resolution and the like are methods for forming a satisfactory solid image shared by the serial-type and the line-type.

In addition, in the case of a serial-type, since it is possible to attach the ink composition to the recording medium with a resolution higher than the head resolution as described above, it is possible to select these as methods for forming a satisfactory solid image. However, as described above, because the time needed for the operation of the recording head or the recording medium increases for the methods in the serial-type, in cases emphasizing image formation speed, there are cases in which a method using a modification of the ink composition is more preferable.

Moreover, the ink composition of the present embodiment is ejected in droplet form from the recording head; however, it is easy for the ink composition to be attached to the recording medium with a higher resolution than the head resolution by setting the mass per droplet thereof to 3 ng or higher to 50 ng or lower and preferably 5 ng or higher to 40 ng or lower. In addition, the ink composition of the present embodiment, as described above, is able to achieve a good balance of increasing the volume (mass) of the droplets of the ink composition, increasing the wetting and spreading properties of the ink composition on the recording medium, suppressing cissing of the ink composition on the recording medium.

2.3. Image Forming Method

The image forming method of the present invention is realized by the ink composition and ink jet recording device, and includes an image forming step ejecting droplets of the ink composition on the recording medium. In addition, the image forming according to the present embodiment may further include a drying step in which the ink composition on the recording medium is dried either before image formation or after image formation, as necessary. Below, each step will be schematically described.

2.3.1. Image Forming Step

The image forming step in the image forming method according to the present embodiment is a step in which droplets of the ink composition described above are ejected and attached to the recording medium using an ink jet recording method, thereby forming a predetermined image.

The ink jet recording method uses the above-described serial-type or line-type ink jet recording device; however, the method is not particularly limited if it enables droplets to be attached to the recording medium by the ink composition being ejected as droplets from minute nozzle apertures. For example, examples of the ink jet recording method include an electrostatic suction method, a method in which ink droplets are ejected by the pressure of a pump, a method using a piezoelectric element, and a method in which the ink solution is heated and caused to bubble by minute electrodes, thereby causing ink droplets to be ejected.

The above-described non-absorbent or low absorbent recording medium is used as the recording medium. The image forming method according to the present embodiment is able to suitably use a non-absorbent or low absorbent recording medium because the above-described ink composition is used.

In the image forming method of the present embodiment, it is possible to more rapidly form a satisfactory solid image by satisfying the conditions (1) or (2) described below.

(1) In a case in which the recording head is a serial head, the image resolution in a direction orthogonal to a main scanning direction is 4 times the head resolution in a direction orthogonal to the main scanning direction and (2) in a case in which the recording head is a line head, the above-described condition (1) is a condition, in a serial-type ink jet recording device, that the operation of the recording head in the main scanning direction is not excessively frequent, and it is possible to perform sufficiently rapid image forming if the image resolution is 4 times the head resolution or lower. Naturally, under these conditions, more rapid image formation is further possible if the image resolution is equal to the head resolution. The above-described condition (2) stipulates that it is possible to perform rapid image formation if the device is a line-type ink jet recording device.

Such a speed increase in image formation may be achieved by the action effects of the ink composition exhibiting sufficient wetting and spreading properties on a sufficiently suppressing cissing, as well as being able to increase the mass of droplets ejected from the nozzles.

2.3.2. Drying Step

The image forming method according to the present embodiment may have a drying step. The drying step is a step in which the ink composition (image) on the recording medium is caused to dry in at least one of during the image forming step or after the image forming step. By combining the drying step, it is possible for the liquid medium contained in the ink composition (specifically, water and preferably used alkyl polyol or glycol ether) attached to the recording medium to be rapidly evaporated. In so doing, even on a recording medium which is non absorbent to ink such as a plastic film not having an ink absorbing layer, it is possible to obtain a high quality image in a short time.

The drying step is not particularly limited if it is a method in which the evaporation of the liquid medium present in the ink is promoted. Examples of methods used in the drying step include a method of adding heat to the recording medium in at least one of during the drying step and after the drying step, a method of blowing air onto the image on the recording medium after the image forming step, and further a method in which these methods are combined. Specifically, as units used in these methods, forced-air heating, radiation heating, conduction heating, high-frequency drying, microwave drying or the like are preferably used.

Moreover, ink composition of the present embodiment is able to attach across a wide range even if the ejection amount from the recording head is low, since the wetting and spreading properties on the recording medium are good. Therefore, in a case in which the drying step is performed, because it is possible for the amount of the liquid medium evaporated to be reduced, it is possible to reduce the energy needed for the drying step.

3. Examples and Comparative Examples

Hereinafter, the invention will be further described by the Examples shown; however, the invention is not limited to the examples below.

3.1. Preparation of Ink Composition

The respective ink compositions of the Examples and Comparative Examples were prepared by introducing the materials shown in Table 2 being into a container and filtered using a membrane filter with a hole diameter of 5 μm after mixing and stirring was performed for 2 hours by a magnetic stirrer. Moreover, the numerical values in Table 2 represent mass %, and ion exchange water is added such that the total amount of ink becomes 100 mass %. In addition, the content of color material is the solid content conversion value.

TABLE 2

|  |  | Example | | | | | Comparative Example | | | | | |
|---|---|---|---|---|---|---|---|---|---|---|---|---|
|  |  | 1 | 2 | 3 | 4 | 5 | 1 | 2 | 3 | 4 | 5 | 6 |
| Color Material | PB15:3 (Solid Content) | 4 | 4 | 4 | 4 | 4 | 4 | 4 | 4 | 4 | 4 | 4 |
| Surfactant | Surfactant A | 1 | 0.6 | — | — | — | — | 1.6 | 1 | — | 1.6 | 1 |
|  | Surfactant B | — | — | 1 | 0.6 | — | — | — | — | — | — | — |
|  | FS-300 | — | — | — | — | 1 | — | — | — | — | — | — |
| Compound I | BYK333 | 0.6 | 1 | — | 1 | — | 0.6 | — | — | 1.6 | — | 0.6 |
|  | BYK337 | — | — | 0.6 | — | 0.6 | — | — | — | — | — | — |
| Other Surfactant | BYK348 | — | — | — | — | — | 1 | — | 0.6 | — | — | — |
| Alkyl Polyol | 1,2-hexanediol (Standard Boiling Point: 224° C.) | 5 | 5 | 5 | 5 | 5 | 5 | 5 | 5 | 5 | 5 | 5 |
|  | Propylene Glycol (Standard Boiling Point: 188° C.) | 15 | 15 | 15 | 15 | 15 | 15 | 15 | 15 | 15 | 15 | — |
|  | Glycerin (Standard Boiling Point: 290° C.) | — | — | — | — | — | — | — | — | — | — | 15 |
| Anti-foaming Agent | DF110D | 0.5 | 0.5 | 0.5 | 0.5 | 0.5 | 0.5 | 0.5 | 0.5 | 0.5 | — | 0.5 |
| Glycol Ether | Diethylene glycol-2-ethylhexylether (HLB value: 5.4) | 1 | 1 | 1 | 1 | 1 | 1 | 1 | 1 | 1 | 1 | 1 |

TABLE 2-continued

|  |  | Example | | | | | Comparative Example | | | | | |
|---|---|---|---|---|---|---|---|---|---|---|---|---|
|  |  | 1 | 2 | 3 | 4 | 5 | 1 | 2 | 3 | 4 | 5 | 6 |
| Water | Ion exchange Water | Remainder | Remainder | Remainder | Remainder | Remainder | Remainder | Remainder | Remainder | Remainder | Remainder | Remainder |
| Total |  | 100 | 100 | 100 | 100 | 100 | 100 | 100 | 100 | 100 | 100 | 100 |

Each material shown in Table 2 is as follows.
Color Material
Cyan Pigment (C.I. Pigment Blue PB 15:3)
Surfactant
Surfactant A: a compound in which in the above-described formula (II), k = 3, n = 12 to 14, m = 0, p = 11 to 12, q = 7 to 10 and p/(q + p) = 0.53 to 0.63, and $R^2$ is a hydrogen atom; surface tension at 1 mass % = 22 mN/m
Surfactant B: a compound in which in the above-described formula (II), k = 3, n = 7 to 10, m = 0, p = 6 to 8, q = 10 to 14 and p/(q + p) = 0.3 to 0.44, and $R^2$ is a hydrogen atom; surface tension at 1 mass % = 20.5 mN/m
Fluorine-based surfactant: FS-300 (manufactured by Dupont); surface tension at 1 mass % = 18 mN/m
Compound I
Polyether-modified organo dimethylsiloxane: BYK-333 (manufactured by BYK Chemie Japan)
Polyether-modified organo dimethylsiloxane: BYK-337 (manufactured by BYK Chemie Japan)
Other Surface Active Substances
Polyether-modified organo siloxane: BYK-348 (manufactured by BYK Chemie Japan); surface tension at 1 mass % = 25.8 mN/m
Alkyl Polyol
1,2-hexanediol; standard boiling point = 224° C.
Propylene glycol; standard boiling point = 188° C.
Glycerin; standard boiling point = 290° C.
Anti-foaming Agent
DF 110 D (manufactured by Air Products and Chemicals, Inc.) (acetylene glycol-based surfactant)
Glycol Ether
Diethyleneglycol-2-ethylhexylether (HLB value: 5.4)
Water
Ion Exchange Water 3.2. Evaluation Test
3.2.1. Evaluation of Solid Image 1

The ink compositions of each example obtained as described above were filled into ink cartridges for a serial-type ink jet recording device "PX-G 5100" (product name) (manufactured by Seiko Epson Corp.). The head resolution of the printer was 180 dpi. The reciprocating operation of the recording head and the sending of the paper were controlled along with the voltage waveform for driving the ejection mechanism of the recording head being adjusted such that the recording resolution became 720 dpi vertically and horizontally. In addition, the mass per ink droplet was set to 10.4 ng/dot.

Next, a solid image was printed on three types of recording medium, a film (non-absorbent), coated paper (low absorbent) and high quality paper (absorbent), with ink compositions of each of the examples. As the three types of recording medium, specifically, a polypropylene film "SY 51M" (product name) (manufactured by UPM Raflata), "NP Coat" (product name) (manufactured by Lintec Corp.) and "Xerox 4024" (product name) (manufactured by Fuji Xerox Co., Ltd) were used as the film, coated paper and high quality paper, respectively.

The evaluation standards in the Evaluation of Solid Image 1 were set to
A: Solid fill was satisfactory at a duty of 90%
B: Solid fill was satisfactory at a duty of 100%
C: White stripes or unevenness occurred at a duty of 100%
D: Solid image formation unacceptable due to cissing or unevenness at a duty of 100%
and the evaluation results are disclosed in Table 3.

TABLE 3

|  |  |  |  | Example | | | | | Comparative Example | | | | | |
|---|---|---|---|---|---|---|---|---|---|---|---|---|---|---|
|  |  |  | Contact Angle Test Results | 1 | 2 | 3 | 4 | 5 | 1 | 2 | 3 | 4 | 5 | 6 |
| Evaluation Result | Solid Image Evaluation 1 | Film | Contact Angle Lowering Rate less than 1% | A | B | A | B | A | C | C | C | D | C | A |
|  |  | Coated Paper | Contact Angle Lowering Rate 1% or higher to less than 5% | A | B | A | A | A | B | B | C | D | B | A |
|  |  | High Quality Paper | Contact Angle Lowering Rate 5% or higher | A | A | A | A | A | A | A | A | B | A | A |
|  | Tackiness |  |  | ○ | ○ | ○ | ○ | ○ | ○ | ○ | ○ | ○ | ○ | X |
|  | Ejection Stability |  |  | ○ | ○ | ○ | ○ | ○ | ○ | ○ | ○ | ○ | X | ○ |

|  |  | Head Resolution (dpi) | Recording Resolution (dpi) | Ink Droplet Mass (ng/dot) |  |  |  |  |  |  |  |  |  |  |
|---|---|---|---|---|---|---|---|---|---|---|---|---|---|---|
| Solid Image Evaluation 2 | 1 | 180 | 180 | 39.4 | ○ | ○ | ○ | ○ | ○ | X | X | X | X | X | ○ |
|  | 2 |  | 360 | 20.4 | ○ | ○ | ○ | ○ | ○ | X | X | X | X | X | ○ |
|  | 3 |  | 720 | 10.4 | ○ | ○ | ○ | ○ | ○ | Δ | Δ | Δ | X | Δ | ○ |

TABLE 3-continued

| 4 |     | 1440 | 5.3  | ○ | ○ | ○ | ○ | ○ | ○ | ○ | ○ | ○ | ○ | ○ |
| 5 | 360 | 360  | 20   | ○ | ○ | ○ | ○ | ○ | X | X | X | X | X | ○ |
| 6 |     | 720  | 10.2 | ○ | ○ | ○ | ○ | ○ | Δ | Δ | X | X | Δ | ○ |
| 7 |     | 1440 | 5.3  | ○ | Δ | ○ | ○ | ○ | ○ | ○ | ○ | Δ | ○ | ○ |

Moreover, the duty (duty) is a value calculated using the following formula.

duty (%)={(number of actually printed dots)/(vertical resolution)×(horizontal resolution)}×100

In the formula, the term "number of actually printed dots" indicates the number of dots per unit area, and the terms "vertical resolution" and "horizontal resolution" indicate the image resolution per vertical and horizontal unit length, respectively.

In addition, 0.5 μL water droplets were dropped on the recording surface of the recording medium, the rate of decrease of the contact angle (0.5 ms to 5 sec after landing) was measured, and the results are noted in Table 3.

3.2.2. Evaluation of Tackiness

The solid image portion of the film provided in the "Evaluation of Solid Image 1" above was rubbed reciprocally 10 times using a rubbing block to which a white cotton cloth (compliant with JIS L 0803) was attached while applying a 300 g load. Then, the amount of the ink composition attached to the white cotton cloth was visually observed.

The evaluation standards were set as below, and the results are disclosed in Table 3.

○: abrasion of the solid image and attachment of the ink composition to the white cotton cloth were not recognized
x: abrasion of the solid image or attachment of the ink composition to the white cotton cloth was recognized 3.2.3. Evaluation of Ejection Stability.

Similarly to the above "Evaluation of Solid Image 1", solid images were printed with respect to 150 sheets of film (A4 size). Then, the 150 sheets of recorded matter were visually observed, and the ejection stability of the ink composition from the recording head was evaluated.

The evaluation standards were set to
○: missing dots and curved flying were not recognized, even after the 100th sheet from the start of recording
x: missing dots or curved flying were recognized within 100 sheets from the start of recording and the evaluation results are disclosed in Table 3.

3.2.4. Evaluation of Solid Image 2

In addition to the above-described "Evaluation of Solid Image 1", evaluation was performed on cases in which the mass per ink droplet was changed. The head resolution was set to 180 dpi and 360 dpi. Testing of the head resolution at 360 dpi was performed using a serial-type ink jet printer "PXH-8000" (product name) (manufactured by Seiko Epson Corp). In addition, a polypropylene film "SY51M" (product name) (manufactured by UPM Raflata) was used as the recording medium.

Next, the mass per ink droplet for each ink composition was set as disclosed in Table 3, the other conditions were set the same as performed in "Evaluation of Solid Image 1", and a solid image was printed using the ink composition of each example.

The recording resolution in the Evaluation of Solid Image 2 (resolution in a direction orthogonal to the main scanning direction) was set to 1 times (180 dpi), 2 times (360 dpi), 4 times (720 dpi) and 8 times (1440 dpi) in a case of a head resolution of 180 dpi, and to 1 times (360 dpi), 2 times (720 dpi) and 4 times (1440 dpi) in a case of a head resolution of 360 dpi. In addition, the duty was set to 100% at any of the resolutions.

The evaluation standards in the Evaluation of Solid Image 2 were set to
○: solid filling was satisfactory at a duty of 100%
Δ: white stripes or unevenness occurred at a duty of 100%
x: Solid image formation unacceptable due to cissing or unevenness at a duty of 100% and the evaluation results are disclosed in Table 3.

Moreover, the mass per ink droplet was determined by performing separate testing. That is, droplets were ejected 10 times from the nozzles, the ink mass thereof was measured with a precision balance, and the average ink mass was calculated by dividing by the total number of ink droplets discharged (product of the number of discharges of each nozzle and the number of nozzles).

3.3. Evaluation Result

The ink composition of each example showed excellent results in Evaluation of Solid Image 1 and 2, Evaluation of Tackiness and Evaluation of Ejection Stability. In addition, in examples (Examples 1, 3, 5) where the mass fraction α of the surfactant is greater than the mass fraction of compound I, it was found that it is possible to form a superior solid image on a recording medium with a greater contact angle.

In contrast, in Comparative Example 1 including another surfactant in place of the surfactant and Comparative Example 4 not including a surfactant, an insufficient solid image due to white stripes or unevenness was formed on a recording medium with a large contact angle, and further, cissing and unevenness occurred in cases in which the ink droplet mass was large. Furthermore, in Comparative Example 3 including another surfactant in place of the compound I and Comparative Examples 2 and 5 not including the compound I, an insufficient solid image due to white stripes or unevenness was similarly formed on a recording medium with a large contact angle, and further, cissing and unevenness occurred in cases in which the ink droplet mass was large. In Comparative Example 5, the ejection stability was also insufficient.

In addition, even if the surfactant and the compound I are contained, in Comparative Example 6 containing glycerin with a standard boiling point of 290° C., even though the solid image is satisfactory, it was found that the tackiness was insufficient.

The present invention is not limited to the embodiments described above, and further, various modifications thereof are possible. For example, the present invention includes configurations which are substantially the same as the configurations described in the embodiments (for example, configurations having the same functions, methods and results, or configurations having the same purposes and effects). In addition, the present invention includes configurations in which non-essential parts of the configurations described in the embodiments are replaced. In addition, the invention includes configurations exhibiting the same action effects as the configurations described in the embodiments or configurations capable of achieving the same object. In addition, the invention includes configurations to which known techniques are added to the configurations described in the embodiments.

What is claimed is:

1. An ink composition for ink jet recording in which a non-absorbent or low absorbent recording medium is used, the composition comprising:
water;
a color material;
a surfactant;
a compound I represented by general formula (I) below; and
substantially not including alkyl polyols with a standard boiling point of 280° C. or higher;
wherein the surfactant includes a fluorine-based surfactant and a siloxane-based surfactant with 5 or more siloxane units,

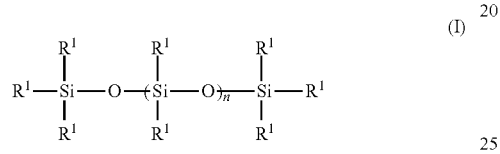

(I)

wherein in general formula (I), n represents an integer in the range of 45 to 230, each $R^1$ independently represents an unmodified, an ether-modified, a polyester-modified, an epoxy-modified, an amine-modified, a carboxyl-modified, a fluorine-modified, an alkyloxy-modified, a mercapto-modified, a (meth)acryl-modified, a phenol-modified, a phenyl-modified, a carbinol-modified or an aralkyl-modified hydrocarbon group; and
wherein the siloxane-based surfactant with 5 or more siloxane units includes a compound represented by general formula (II) below:

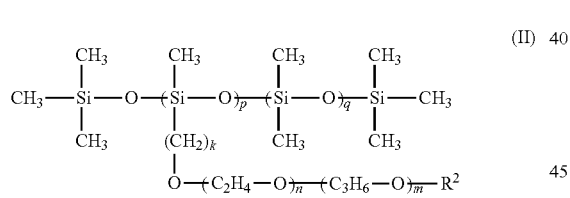

(II)

wherein, in general formula (II), k represents an integer of 1 or higher to 5 or lower, n represents an integer of 1 or higher, m represents an integer of 0 to 15, p represents an integer of 1 or higher, q represents an integer of 5 to 30, the value of p/(q+p) is 0.2 to 0.8, and $R^2$ represents an alkyl group having 1 to 5 hydrogen atoms or carbon atoms; and
wherein the fluorine-based surfactant is selected from the group consisting of perfluoroalkyl sulfonates, perfluoroalkyl carboxylates, perfluoroalkyl phosphoric acid esters, perfluoroalkyl ethylene oxide adducts, perfluoroalkyl betaines, and perfluoroalkylamine oxide compounds.

2. The ink composition according to claim 1, wherein the surfactant has a surface tension in the range of 15 mN/m to 25 mN/m in a 1 mass % aqueous solution thereof.

3. The ink composition according to claim 1, wherein the value of α/β is in the range of 0.5 to 20 in a case where the mass fraction of the surfactant is set to α, and the mass fraction of the compound I in the ink composition is set to β.

4. The ink composition according to claim 1, wherein, in general formula (II), m is 0, n represents an integer of 2 or higher to 30 or lower, p represents an integer of 5 or higher to 15 or lower, and $R^2$ is a hydrogen atom or a methyl group.

5. The ink composition according to claim 1, further comprising a glycol ether with an HLB value of 4.2 or higher to 7.8 or lower calculated with the Davies' method.

6. An ink composition for ink jet recording in which a non-absorbent or low absorbent recording medium is used, the composition comprising:
water;
a color material;
a surfactant;
a compound I represented by general formula (I) below; and
substantially not including alkyl polyols with a standard boiling point of 280° C. or higher;

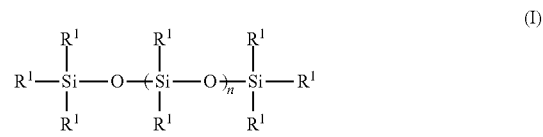

(I)

wherein in general formula (I), n represents an integer in the range of 45 to 230, each $R^1$ independently represents an unmodified, an ether-modified, a polyester-modified, an epoxy-modified, an amine-modified, a carboxyl-modified, a fluorine-modified, an alkyloxy-modified, a mercapto-modified, a (meth)acryl-modified, a phenol-modified, a phenyl-modified, a carbinol-modified or an aralkyl-modified hydrocarbon group; and
wherein the surfactant includes a compound represented by general formula (II) below:

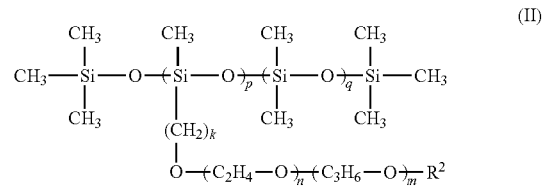

(II)

wherein in general formula (II), k represents an integer in the range of 1 to 5, n represents an integer of 1 or higher, m represents an integer in the range of 0 to 15, p represents an integer of 1 or higher, q represents an integer in the range of 5 to 30, the value of p/(q+p) is in the range of 0.2 to 0.8, and $R^2$ represents an alkyl group having 1 to 5 hydrogen atoms or carbon atoms.

7. An image forming method recording an image on a non-absorbent or low absorbent recording medium by ejecting the ink composition according to claim 1 from a recording head.

8. The image forming method according to claim 7, satisfying either of condition (1) or (2) below:
(1) The recording head is a serial head, and the image resolution in a direction orthogonal to a main scanning direction is 4 times the head resolution or less in a direction orthogonal to the main scanning direction;
(2) The recording head is a line head.

9. The image forming method according to claim 8, wherein the ink composition is ejected in droplet form from the recording head, and the mass per droplet of the ink composition ejected from the recording head is 5 ng or higher to 40 ng or lower.

10. An image forming method recording an image on a non-absorbent or low absorbent recording medium by ejecting the ink composition according to claim 2 from a recording head.

11. The image forming method according to claim 10, satisfying either of condition (1) or (2) below:
   (1) The recording head is a serial head, and the image resolution in a direction orthogonal to a main scanning direction is 4 times the head resolution or less in a direction orthogonal to the main scanning direction;
   (2) The recording head is a line head.

12. The image forming method according to claim 11, wherein the ink composition is ejected in droplet form from the recording head, and
   the mass per droplet of the ink composition ejected from the recording head is 5 ng or higher to 40 ng or lower.

13. An image forming method recording an image on a non-absorbent or low absorbent recording medium by ejecting the ink composition according to claim 3 from a recording head.

14. The image forming method according to claim 13, satisfying either of condition (1) or (2) below:
   (1) The recording head is a serial head, and the image resolution in a direction orthogonal to a main scanning direction is 4 times the head resolution or less in a direction orthogonal to the main scanning direction;
   (2) The recording head is a line head.

15. An image forming method recording an image on a non-absorbent or low absorbent recording medium by ejecting the ink composition according to claim 6 from a recording head.

16. The image forming method according to claim 15, satisfying either of condition (1) or (2) below:
   (1) The recording head is a serial head, and the image resolution in a direction orthogonal to a main scanning direction is 4 times the head resolution or less in a direction orthogonal to the main scanning direction;
   (2) The recording head is a line head.

17. An image forming method recording an image on a non-absorbent or low absorbent recording medium by ejecting the ink composition according to claim 4 from a recording head.

18. The image forming method according to claim 17, satisfying either of condition (1) or (2) below:
   (1) The recording head is a serial head, and the image resolution in a direction orthogonal to a main scanning direction is 4 times the head resolution or less in a direction orthogonal to the main scanning direction;
   (2) The recording head is a line head.

19. An image forming method recording an image on a non-absorbent or low absorbent recording medium by ejecting the ink composition according to claim 5 from a recording head.

20. The image forming method according to claim 19, satisfying either of condition (1) or (2) below:
   (1) The recording head is a serial head, and the image resolution in a direction orthogonal to a main scanning direction is 4 times the head resolution or less in a direction orthogonal to the main scanning direction;
   (2) The recording head is a line head.

\* \* \* \* \*